AMPLITUDE MODULATION SYSTEM

Filed April 21, 1961 2 Sheets-Sheet 1

INVENTOR.
BRUCE G. CRAMER
BY
Fordyce A. Bothwell
ATTORNEY

INVENTOR.
BRUCE G. CRAMER
BY
Fordyce A. Bothwell
ATTORNEY

3,170,127
AMPLITUDE MODULATION SYSTEM

Bruce G. Cramer, Norristown, Pa., assignor, by mesne assignments, to Philco Corporation, Philadelphia, Pa., a corporation of Delaware

Filed Apr. 21, 1961, Ser. No. 104,668
7 Claims. (Cl. 332—41)

The invention relates to amplitude modulation systems and more particularly to that type of amplitude modulation known as outphasing modulation.

The outphasing system, though not as well known as other more commonly used systems, is described in prior publications. See, for example, Radio Engineers' Handbook by Terman, first edition, pages 546 and 547, published in 1943 by McGraw-Hill Book Co., Inc. of New York. This system was first described by H. Chireix in a paper published in the Proceedings of the Institute of Radio Engineers for November 1935, volume 23, pages 1370 to 1392. One advantage of this system is that it enables the production of linear modulation using high efficiency class C amplifiers.

The outphasing system is based on the fact that two phase-displaced signals of constant amplitude and varying phase can be added to produce an amplitude-modulated signal of constant phase. Thus in the outphasing system, two constant-amplitude phase-displaced signals are oppositely phase-modulated according to a modulation signal, and then the two phase-modulated signals are added to produce a resultant signal which is of constant phase and is amplitude modulated according to the modulation signal.

The production of true amplitude modulation in such a system requires that the opposite phase modulation of the above-mentioned two signals be exactly the same, and further requires that the phase modulation be such as to produce in the resultant signal amplitude modulation which is proportional to the amplitude of the modulation signal. Prior arrangements for producing the two phase-modulated signals have not been entirely satisfactory because they have not fully met these requirements.

The principal object of the present invention is to provide an improved outphasing system in which true amplitude modulation is achieved.

Other objects and features of the invention will be apparent as the description proceeds.

In accordance with this invention, the two oppositely phase-modulated signals which are added to produce the desired constant-phase amplitude-modulated signal are produced by adding the modulation signal to a carrier signal, and then producing from the resultant signal the desired two oppositely phase-modulated signals. More particularly, the signal resulting from addition of the modulation signal and the carrier signal is limited to produce a rectangular wave signal, and a second rectangular wave signal of opposite phase is produced, e.g., by inverting the first rectangular wave signal. Then the two rectangular wave signals are differentiated to produce two spike signals, and these signals are utilized to produce the desired two oppositely phase-modulated signals.

In this system the phase shift of the two oppositely phase-modulated signals is proportional to the arcsine of the modulation signal. Hence the system is aptly designated Arcsine Modulator.

The invention may be fully understood from the following detailed description with reference to the accompanying drawings wherein FIG. 1 is a vector diagram illustrating the operating principle of the outphasing system;

Figure 1:
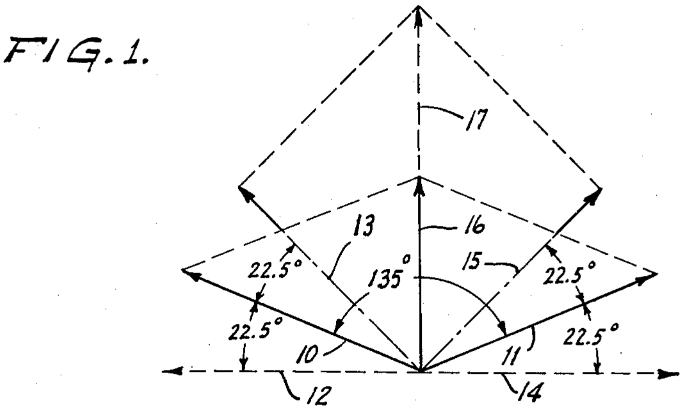

Referring first to FIG. 1, the principle of operation of the outphasing system can be readily understood with the aid of the vector diagram there shown. In this illustration vectors 10 and 11 displaced by 135° have been chosen arbitrarily to represent typically two phase-displaced signals which are oppositely phase modulated within an arbitrarily chosen range of ±22.5° representing 100% modulation. Vectors 12 and 13 represent maximum excursions of one signal, while vectors 14 and 15 represent maximum excursions of the other signal.

Adding the two signals gives a resultant signal which is of constant phase and which varies in amplitude according to the phase modulation of the two signals. Thus vector 16 represents the resultant signal produced by addition of the unmodulated signals represented by vectors 10 and 11, while vector 17 represents the increase in amplitude of the resultant signal when the two signals are phase modulated to the extremes represented by vectors 13 and 15. With the arbitrarily chosen 45° range, the amplitude of the resultant signal may vary from zero to the maximum amplitude represented by vector 17.

Thus in the outphasing system a constant-phase amplitude-modulated signal is produced by adding two constant-amplitude signals which are phase-modulated in opposite senses. As hereinbefore stated, because of difficulties in generating the required phase-modulated signals, prior systems of this type have not fully met the requirements for true amplitude modulation.

Figure 2:
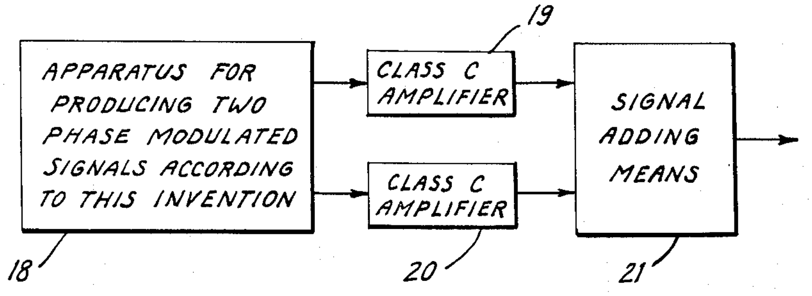
FIG. 2 is a general block diagram of an outphasing system embodying the present invention.

Referring now to FIG. 2, there is shown a general block diagram of an outphasing system embodying this invention. Block 18 represents apparatus for producing the desired two phase-modulated signals according to this invention. These signals are supplied respectively to class C amplifiers 19 and 20 whose output signals are supplied to signal adding means 21, as in any outphasing system.

Figure 3:
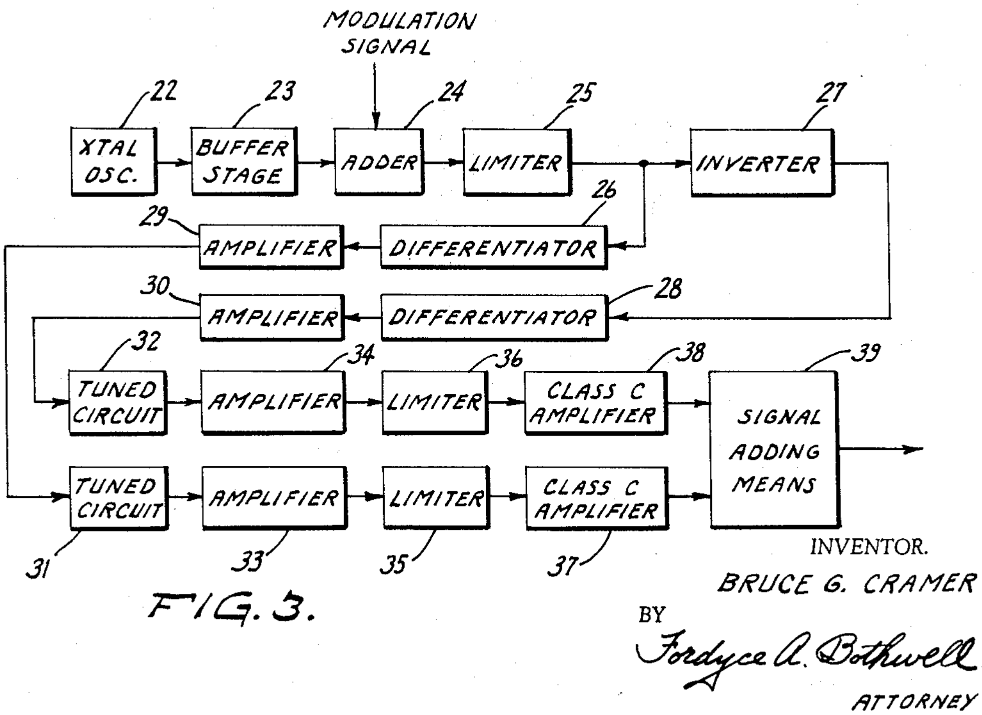
FIG. 3 is a detailed block diagram of a preferred form of the system according to this invention.

FIG. 3 shows a detailed block diagram of a preferred form of the system according to this invention. A carrier signal is supplied from crystal oscillator 22 through buffer stage 23 to an adder 24 to which the modulation signal is also supplied. The resulting signal is limited in limiter 25 to produce a rectangular wave signal which is differentiated in differentiator 26. The same signal is inverted in inverter 27 to produce a second rectangular wave signal which is differentiated in differentiator 28. The two spike signals produced by the differentiators are supplied respectively to amplifiers 29 and 30 and thence to tuned circuits 31 and 32 to produce sinusoidal signals. These signals are oppositely phase-modulated according to the modulation signal as hereinafter described.

The two signals thus produced may be amplified in amplifiers 33 and 34 and may be limited in limiters 35 and 36 to remove any spurious amplitude modulation. The signals are supplied to class C amplifiers 37 and 38 whose output signals are supplied to adding means 39.

Figure 4:
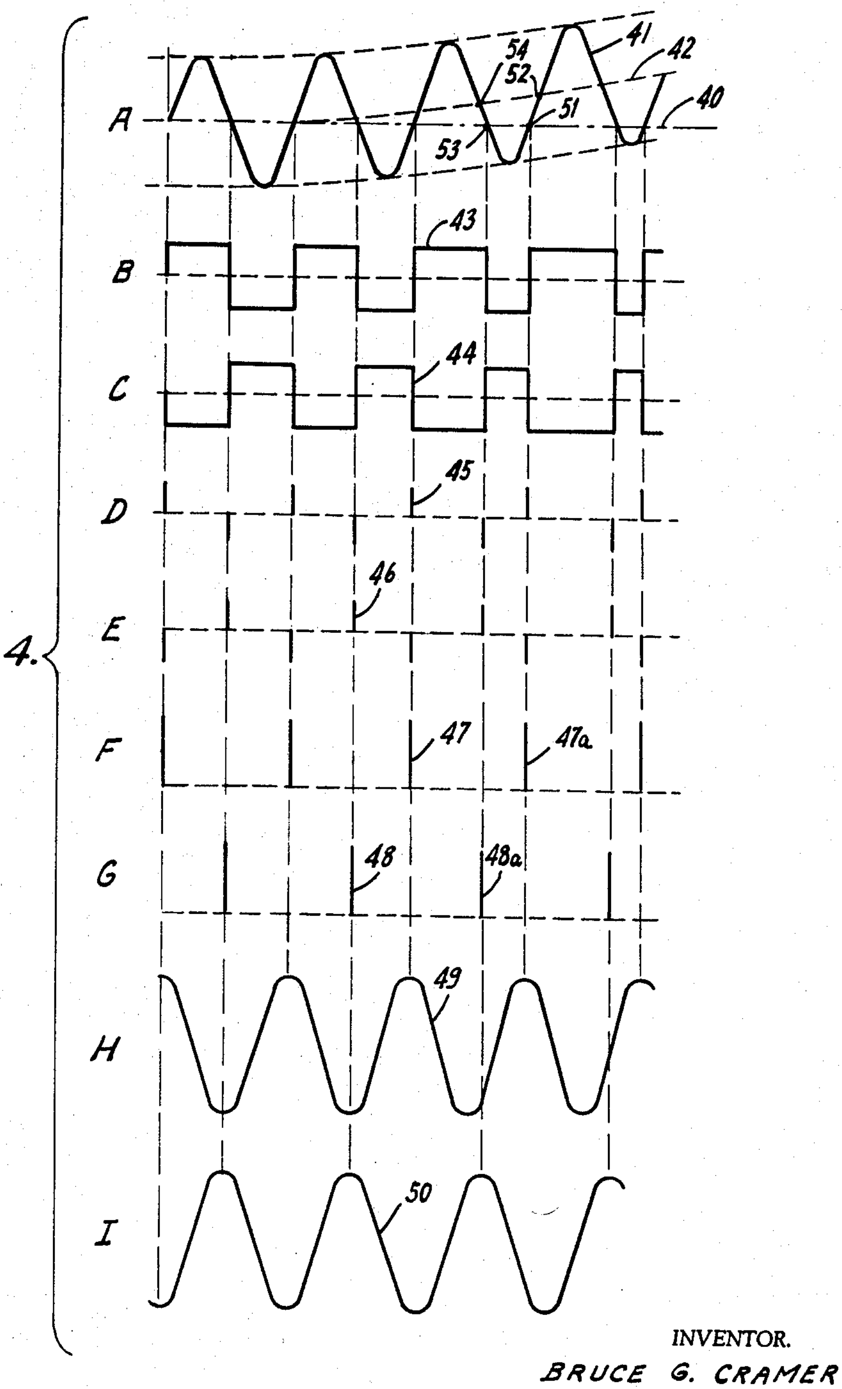
FIG. 4 is a waveform diagram illustrating the operation of this invention.

The operation of the system shown in FIG. 3 may be clearly understood with the aid of FIG. 4 to which reference is now made. Illustration A in FIG. 4 shows the signal resulting from the addition in adder 24 of the carrier signal and the modulation signal. In this resultant signal the axis 40 of the carrier signal 41 is varied as shown at 42 according to the algebraic addition of the modulation signal. Limiting of this resultant signal in limiter 25 produces the rectangular wave signal 43 of illustration B which is supplied to differentiator 26. Inversion of the same signal in inverter 27 produces the second rectangular wave signal 44 of illustration C which is supplied to differentiator 28. Differentiation of the two rectangular wave signals 43 and 44 in differentiators 26 and 28 produces the two spike signals 45 and 46 of illustrations D and E. These signals are supplied to amplifiers 29 and 30 which are biased to eliminate the negative spikes and which amplify the positive spikes, thus producing the spike signals 47 and 48 of illustrations F and G whose frequency is that of the carrier. Amplifiers 29 and 30 are tuned to the carrier frequency by tuned circuits 31 and 32 in order to select the fundamental component of each spike signal and eliminate harmonics. These signals preferably are further amplified in amplifiers 33 and 34 and are limited in limiters 35 and 36 to remove any spurious amplitude modulation. Typically, these amplifiers and limiters are also tuned to the carrier frequency. The resulting signals, shown at 49 and 50 in illustrations H and I of FIG. 4, are oppositely phase-modulated according to the modulation signal. They are supplied to the class C amplifiers 37 and 38 and thence to the signal adding means 39 to produce the desired amplitude-modulated signal as hereinbefore described with reference to FIG. 1.

The fact that the two signals derived in the system of FIG. 3 are oppositely phase-modulated according to the modulation signal may be seen from FIG. 4. The effect of adding a positive modulation voltage to the carrier signal, as shown in FIG. 4A, is to advance the position of the spikes in signal 47 and to retard the position of the spikes in signal 48 by substantially the same amount. Consider, for example, spikes 47*a* and 48*a*. Spike 47*a* coincides in time with point 51 in illustration A. Since this point is ahead of point 52, it is apparent that the position of spike 47*a* is advanced. Similarly, spike 48*a* coincides in time with point 53 in illustration A. Since this point is subsequent to point 54, it is apparent that the position of spike 48*a* is retarded. The opposite phase modulation of the spike signals 47 and 48 produce similar modulation in the signals 49 and 50 which are added to produce the desired amplitude-modulated signal.

Referring again to FIG. 1, it is apparent that the amplitude modulation of the resultant signal is proportional, not to the phase angle of the added signals, but to its sine. In the system provided by this invention, the phase shift of the two oppositely phase-modulated signals is proportional to arcsine $V_M$, where $V_M$ is the modulation voltage having a maximum peak-to-peak amplitude of 1 unit (assuming the carrier voltage is 1 unit, zero to peak). Thus in this system, the amplitude modulation of the output signal is proportional to sine (arcsine $V_M$), which is simply $V_M$. Therefore no distortion occurs since the amount of phase shift exactly compensates for the non-linear way in which the vectors in FIG. 1 add. This is not true of prior outphasing systems in which there is no compensation for the non-linearity and therefore the amplitude modulation of the output signal is somewhat distorted.

In addition to the above important advantage, this system has the advantages of simplicity, ease of alignment, and stability. It also has the advantages of generating phase shift of opposite sense with identical magnitudes regardless of normal component variations, of minimizing or eliminating incidental phase modulation from the resulting amplitude modulation signal, and of being capable of producing suppressed-carrier amplitude modulation by making a simple adjustment. This invention also has the advantage of allowing larger phase shifts than previous outphasing modulation systems, which distorted when the phase shift approached ±45°, and thus permits the system to operate more efficiently.

While the invention has been illustrated and described with reference to a single embodiment, it will be understood that the invention is not limited thereto but contemplates such modifications and further embodiments as may occur to those skilled in the art.

I claim:

1. In an outphasing amplitude-modulation system, apparatus for producing two constant-amplitude phase-displaced signals which are oppositely phase-modulated according to a modulation signal, comprising means for adding the modulation signal to a carrier signal, means for limiting the resulting signal to produce a rectangular wave signal, means for producing a second rectangular wave signal of opposite phase in relation to said first rectangular wave signal, means for differentiating said rectangular wave signals to produce two spike signals, and means for producing from the latter signals the desired two opposítely phase-modulated signals.

2. In an outphasing amplitude-modulation system, apparatus for producing two constant-amplitude phase-displaced signals which are oppositely phase-modulated according to a modulation signal, comprising means for adding the modulation signal to a carrier signal, means for limiting the resulting signal to produce a rectangular wave signal, means for inverting the latter signal to produce a second rectangular wave signal, means for differentiating said rectangular wave signals to produce two spike signals, and means for producing from the latter signals the desired two oppositely phase-modulated signals.

3. In an outphasing amplitude-modulation system, a source of carrier signal, a source of modulation signal, means for adding said carrier signal and said modulation signal, means for producing from the resulting signal two opposite-phase rectangular wave signals, means for differentiating the latter signals to produce spike signals, means for producing from the latter signals two constant-amplitude phase-displaced signals which are oppositely phase-modulated according to said modulation signal, and means for producing from the two-phase-modulated signals a constant-phase signal which is amplitude-modulated according to said modulation signal.

4. In an outphasing amplitude-modulation system, a source of carrier signal, a source of modulation signal, means for adding said carrier signal and said modulation signal, means for limiting the resulting signal to produce a rectangular wave signal, means for producing a second rectangular wave signal of opposite phase in relation to said first rectangular wave signal, means for differentiating said rectangular wave signals to produce two spike signals, means for producing from the latter signals two constant-amplitude phase-displaced signals which are oppositely phase-modulated according to said modulation signal, and means for producing from the two phase-modulated signals a constant-phase signal which is amplitude-modulated according to said modulation signal.

5. In an outphasing amplitude-modulation system, a source of carrier signal, a source of modulation signal, means for adding said carrier signal and said modulation signal, means for limiting the resulting signal to produce a rectangular wave signal, means for inverting the latter signal to produce a second rectangular wave signal of opposite phase in relation to said first rectangular wave signal, means for differentiating said rectangular wave signals to produce two spike signals, means for producing from the latter signals two constant-amplitude phase-displaced signals which are oppositely-phase modulated according to said modulation signal, and means for producing from the two phase-modulated signals a constant-phase signal which is amplitude-modulated according to said modulation signal.

6. In an outphasing amplitude-modulation system, apparatus for producing two constant-amplitude phase-displaced signals which are oppositely phase-modulated according to a modulation signal, comprising means for adding the modulation signal to a carrier signal, means for limiting the resulting signal to produce a rectangular wave signal, means for producing a second rectangular wave signal of opposite phase in relation to said first rectangular wave signal, and means responsive to said rectangular wave signals for producing two oppositely phase-modulated sinusoidal signals whose peaks are coincident with axis-crossing portions of said rectangular wave signals.

7. In an outphasing amplitude-modulation system, apparatus for producing two constant-amplitude phase-displaced signals which are oppositely phase-modulated according to a modulation signal, comprising means for adding the modulation signal to a carrier signal, means for limiting the resulting signal to produce a rectangular wave signal, means for producing a second rectangular wave signal of opposite phase in relation to said first rectangular wave signal, and means responsive to said rectangular wave signals for producing two oppositely phase-modulated sinusoidal signals one of which has positive peaks coincident with the positive-going portions of one of said rectangular wave signals and the other of which has positive peaks coincident with the positive-going portions of the other of said rectangular wave signals.

References Cited in the file of this patent

UNITED STATES PATENTS

| | | |
|---|---|---|
| 2,614,246 | Dome | Oct. 14, 1952 |
| 2,624,041 | Evans | Dec. 30, 1952 |
| 2,714,634 | Hall | Aug. 2, 1955 |

OTHER REFERENCES

Terman: Radio Engineers Handbook, pages 546–547, New York and London, 1943.